United States Patent
Zacharias et al.

(10) Patent No.: US 9,401,003 B2
(45) Date of Patent: Jul. 26, 2016

(54) JUST-IN-TIME PROCESSING OF IMAGES

(71) Applicant: Zebrafish Labs, Inc., San Francisco, CA (US)

(72) Inventors: Christopher Zacharias, San Francisco, CA (US); Jeremy Larkin, Concord, CA (US); David Birdsong, San Francisco, CA (US)

(73) Assignee: ZEBRAFISH LABS, INC., San Francisco, CA (US)

( * ) Notice: Subject to any disclaimer, the term of this patent is extended or adjusted under 35 U.S.C. 154(b) by 131 days.

(21) Appl. No.: 14/083,166

(22) Filed: Nov. 18, 2013

(65) Prior Publication Data

US 2015/0138219 A1      May 21, 2015

(51) Int. Cl.
*G06T 1/20*       (2006.01)
*H04L 29/08*      (2006.01)
*G06T 11/60*      (2006.01)

(52) U.S. Cl.
CPC . *G06T 1/20* (2013.01); *G06T 11/60* (2013.01); *H04L 67/10* (2013.01); *H04L 67/1004* (2013.01); *H04L 67/303* (2013.01); *G06T 2200/16* (2013.01)

(58) Field of Classification Search
None
See application file for complete search history.

(56) References Cited

U.S. PATENT DOCUMENTS

| | | | |
|---|---|---|---|
| 7,631,252 B2 | 12/2009 | Hertzfeld et al. | |
| 7,809,802 B2 | 10/2010 | Lerman et al. | |
| 8,509,569 B2 | 8/2013 | Weiss et al. | |
| 2006/0026511 A1* | 2/2006 | Rainero et al. | 715/523 |
| 2008/0098301 A1* | 4/2008 | Black et al. | 715/246 |
| 2008/0209311 A1 | 8/2008 | Agronik et al. | |
| 2009/0201303 A1* | 8/2009 | Westerhoff et al. | 345/520 |
| 2010/0325191 A1* | 12/2010 | Jung et al. | 709/202 |
| 2011/0016419 A1 | 1/2011 | Grosz et al. | |
| 2011/0227934 A1* | 9/2011 | Sharp | 345/502 |
| 2011/0231475 A1* | 9/2011 | Van der Merwe et al. | 709/203 |
| 2013/0176319 A1 | 7/2013 | Westerhoff et al. | |

(Continued)

FOREIGN PATENT DOCUMENTS

| CN | 102323917 A | 1/2012 |
|---|---|---|
| CN | 103077088 A | 5/2013 |

(Continued)

OTHER PUBLICATIONS

International Search Report and Written Opinion Mailed May 7, 2015 of PCT/US2014/066187 (8 pages).

(Continued)

*Primary Examiner* — Tize Ma
(74) *Attorney, Agent, or Firm* — Perkins Coie LLP

(57) ABSTRACT

Technology is disclosed for processing an image just-in-time, e.g., upon receiving a request for an image ("the technology"). Various embodiments of the technology include processing one or more original images based on a recipe and attributes of the end user device on which the image is viewed to generate a rendered image. A recipe can specify various image processing operations such as a target size, resolution, or color pattern of the image to be rendered, a target portion of the image to be highlighted or cropped etc. In some embodiments, the recipe and the one or more original images can be provided by a client who wishes to publish the rendered image. The end user device attributes such as a type of the end user device, a display size, a display resolution, ambient lighting etc. are also considered for rendering the image.

33 Claims, 7 Drawing Sheets

(56) References Cited

U.S. PATENT DOCUMENTS

| | | |
|---|---|---|
| 2014/0050419 A1 | 2/2014 | Lerios et al. |
| 2014/0072235 A1* | 3/2014 | Costantino ....... H04N 21/44218 382/218 |
| 2015/0205500 A1 | 7/2015 | Zacharias et al. |

FOREIGN PATENT DOCUMENTS

| | | |
|---|---|---|
| JP | 2013031196 A | 2/2013 |
| KR | 20100061583 | 8/2010 |

OTHER PUBLICATIONS

International Search Report and Written Opinion mailed May 4, 2015, for International Application No. PCT/US2015/012310, 10 pages.

U.S. Appl. No. 14/161,280 of Zacharias C. et al. filed Jan. 22, 2014.

Non-Final Office Action mailed Nov. 10, 2015, for U.S. Appl. No. 14/161,280 of Zacharias C. et al. filed Jan. 22, 2014.

Final Office Action mailed May 3, 2016, for U.S. Appl. No. 14/161,280 of Zacharias C. et al. filed Jan. 22, 2014.

\* cited by examiner

JUST-IN-TIME PROCESSING OF IMAGES

TECHNICAL FIELD

Several of the disclosed embodiments relate to image processing, and more particularly, to just-in-time processing of images.

BACKGROUND

Online publishers publish various content including text, image, video and audio. An online publisher may want to publish a particular image in various color schemes, patterns, layouts, etc. For example, an online art merchant may want to publish an image of a sculpture which was captured using a camera online. However, the merchant may want to enhance the image in a particular way before the image is published online to demand a buyer's attention. The merchant may want to generate multiple images showing specific portions of the sculpture.

Current publishing techniques typically require the merchant to generate a version of the particular image for each of the different ways the merchant wishes to publish the image. For example, if the merchant wishes to highlight only the portion of the image having the sculpture, the surrounding portions of the sculpture in the image may have to be blurred. In another example, if the merchant wishes to show how the sculpture looks in a particular decor, the surrounding portions of the sculpture in the image may also have to be shown. This requires the merchant to have different version of the images which serves different purposes. This can be a time consuming process since all versions have to be generated before they are published.

Further, the merchant may have to use a special image editing software to generate such images. The drawback of the current publishing techniques is that the merchant is expected to have image processing skills. Further, the process can also result in increased storage space for storing various versions of the particular image. As the number of images increase, or the versions of a particular image increase, a need arises for a robust version management system. All these factors can add to the maintenance costs for the merchant.

The problem increases by many folds if the image has to be rendered based on the device on which the buyer is viewing the image. Different devices can have different display sizes, form factors, resolutions, rendering techniques etc. Not only this requires the merchant to generate various versions of an image to suit the devices, it also requires the merchant to be aware of the devices available or to be available in the market. Further, in scenarios where certain images are not viewed by the buyers, the computing resources, such as processing time and storage space, for generating and storing such images are not utilized effectively.

SUMMARY

Technology is disclosed for just-in-time processing of an image ("the technology"). Various embodiments of the technology include an image processing system for providing image processing services for clients who publish content, including a number of images, to end users. In some embodiments, processing an image includes executing a set of instructions (also referred to as a "recipe") on one or more original source images to render a processed image on the end user device. The recipe enables the processed images to be rendered on the end user device as per the preferences of a client system using the image processing system.

For example, the recipe can specify that the processed images be rendered in a particular size, color scheme, layout, resolution, etc. The recipe can also specify that a portion of the processed image be highlighted, cropped, a particular color be enhanced, etc. In some embodiments, the recipe may be provided, at least in part, by the client system. The recipe may also be generated, at least in part, by the image processing system. The image processing system enables the client system to obtain various processed images for a given single original source image. In some embodiments, more than one source image may be used to render the processed image.

In some embodiments, the image processing system processes the images upon receiving a request for retrieving the images associated with the content. That is, the image processing system processes the images just-in-time. For example, consider a client system that publishes online content, including images, to the end users using various means, including a website or an application (also known as an "app"). The end users access the content using various devices including a desktop, a laptop, a smartphone, a tablet etc. In some embodiments, when the end user accesses the client system for viewing the online content including images, the client system requests the image processing system to obtain processed images associated with the content. The image processing system processes the images and returns them to the client system which further serves the processed images to the requesting end user device.

In some embodiments, the images are also processed based on a context of the request. The context of the request can include data regarding attributes of the end user device, e.g., a resolution of display, a size of the display, a type of the end user device—a smartphone, tablet, laptop etc., an operating system on the end user device, ambient lighting, a network bandwidth available to the end user device etc. The image processing system renders the processed images based on the attributes of the device. For example, the images can be rendered in a particular resolution based on the resolution of the display of the display of the end user device. In another example, the brightness of the processed image may be adjusted based on the ambient lighting on the end user device. In some embodiments, the context of the request for obtaining the image is included in the request and/or provided by the client system.

In some embodiments, the image processing system can be implemented as a multi-tier architecture having various tiers of servers performing specific functions of the image processing system. Each of the tiers can have one or more servers. The image processing system can include a content delivery network having one or more tiers to receive a request for obtaining an image to be displayed at the end user device from a client system. The servers in the content delivery network can be spread across various geographical locations. The content delivery network receives the request from client systems in various geographical locations passes the request to a load balancing server tier if the processed images are not available at the content delivery network.

The load balancing server tier manages image processing requests from the client system by inserting them into a queue. The load balancing server tier receives the request from the content delivery network and inserts the request into the queue. An image processing server tier obtains an image processing request from the queue and generates a processed image. The processing includes retrieving one or more original source images and processing them based on the recipe and the context of the request to generate the processed image. The processed image is returned to the client system through the content delivery network and the client system further serves the processed image to the end user device.

In some embodiments, the image processing system also includes a source image server tier that is configured to obtain the original source images from a source location specified by the client system, and store them at a source image cache associated with the source image server tier. In some embodiments, the image processing system generates a log file containing data related to the processing of the one or more requested images. The image processing system also includes a prediction server that can predict the different processed images that may be requested by the end user devices in the future. In some embodiments, the prediction server can use various prediction techniques, including statistical analysis, to determine a set of processed images that may be requested in the future based, at least in part, on the data in the log file.

DETAILED DESCRIPTION

Figure 1:
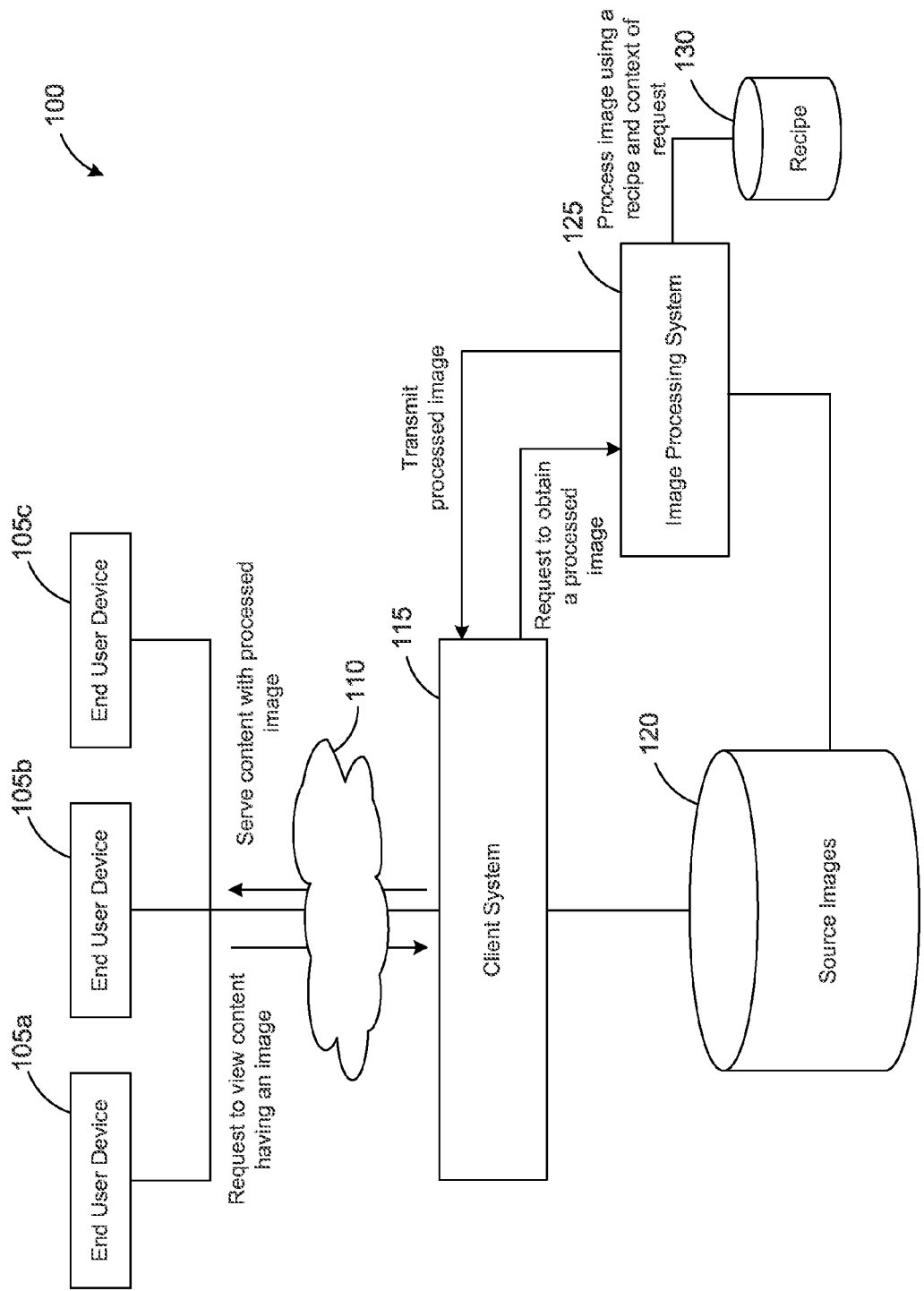
FIG. 1 illustrates an environment where an image processing system can be implemented.

Technology is disclosed for just-in-time processing of an image ("the technology"). Various embodiments of the technology include an image processing system for providing image processing services for clients who publish content, including a number of images, to end users. In some embodiments, processing an image includes executing a set of instructions (also referred to as a "recipe") on one or more original source images to render a processed image on the end user device. The recipe enables the processed images to be rendered on the end user device as per the preferences of a client system using the image processing system.

For example, the recipe can specify that the processed images be rendered in a particular size, color scheme, layout, resolution, etc. The recipe can also specify that a portion of the processed image be highlighted, cropped, a particular color be enhanced, etc. In some embodiments, the recipe may be provided, at least in part, by the client system. The recipe may also be generated, at least in part, by the image processing system. The image processing system enables the client system to obtain various processed images for a given single original source image. In some embodiments, more than one source image may be used to render the processed image.

In some embodiments, the image processing system processes the images upon receiving a request for retrieving the images associated with the content. That is, the image processing system processes the images just-in-time. For example, consider a client system that publishes online content, including images, to the end users using various means, including a website or an application (also known as an "app"). The end users access the content using various devices including a desktop, a laptop, a smartphone, a tablet etc. In some embodiments, when the end user accesses the client system for viewing the online content including images, the client system requests the image processing system to obtain processed images associated with the content. The image processing system processes the images and returns them to the client system which further serves the processed images to the requesting end user device.

In some embodiments, the images are also processed based on a context of the request. The context of the request can include data regarding attributes of the end user device, e.g., a resolution of display, a size of the display, a type of the end user device—a smartphone, tablet, laptop etc., an operating system on the end user device, ambient lighting, a network bandwidth available to the end user device etc. The image processing system renders the processed images based on the attributes of the device. For example, the images can be rendered in a particular resolution based on the resolution of the display of the display of the end user device. In another example, the brightness of the processed image may be adjusted based on the ambient lighting on the end user device. In some embodiments, the context of the request for obtaining the image is included in the request and/or provided by the client system.

In some embodiments, the image processing system can be implemented as a multi-tier architecture having various tiers of servers performing specific functions of the image processing system. Each of the tiers can have one or more servers. The image processing system can include a content delivery network having one or more tiers to receive a request for obtaining an image to be displayed at the end user device from a client system. The servers in the content delivery network can be spread across various geographical locations. The content delivery network receives the request from client systems in various geographical locations passes the request to a load balancing server tier if the processed images are not available at the content delivery network.

The load balancing server tier manages image processing requests from the client system by inserting them into a queue. The load balancing server tier receives the request from the content delivery network and inserts the request into the queue. An image processing server tier obtains an image processing request from the queue and generates a processed image. The processing includes retrieving one or more original source images and processing them based on the recipe and the context of the request to generate the processed image. The processed image is returned to the client system through the content delivery network and the client system further serves the processed image to the end user device.

In some embodiments, the image processing system also includes a source image server tier that is configured to obtain the original source images from a source location specified by the client system, and store them at a source image cache associated with the source image server tier. In some embodiments, the image processing system generates a log file containing data related to the processing of the one or more requested images. The image processing system also includes a prediction server that can predict the different processed images that may be requested by the end user devices in the future. In some embodiments, the prediction server can use various prediction techniques, including statistical analysis, to determine a set of processed images that may be requested in the future based, at least in part, on the data in the log file.

Environment

FIG. 1 illustrates an environment where an image processing system can be implemented. The environment 100 includes a client system 115 that publishes content, including images, which can be accessed by end users using end user devices such as end user devices 105*a-c* via a communication network 110. The end user devices can include a smartphone, a laptop, a desktop, a tablet PC, or any other suitable device for viewing content. The environment 100 also includes an image processing system 125 that receives a request from the client system 115 (e.g., on behalf of an end user device such as end user device 105*a*) for obtaining a processed image (of a source image) which is served to the end user device 105*a* with the content. The image processing system 125 obtains the source image and processes the source image to generate a processed image (also referred to as "rendered image"). The processed image is then returned to the client system 115 which further serves the processed image to the end user device 105*a*.

The source image most often provides the base image data used in producing a processed image. In some embodiments, one or more source images may be used in generating the processed image. In some embodiments, the image processing system 125 obtains the source image from a location such as a source image storage system 120 specified by the client system 115 or from a cache associated with the image processing system 125 (not illustrated). The source image storage system 120 can be any type of storage system including a database, file storage and/or any other convenient or known storage techniques. Further, the source image storage system 120 can be part of the client system 115 or provided by any third party storage services, such as cloud storage from Dropbox, Amazon, Google etc., where the client system 115 has stored the source images at.

The image processing system 125 processes the source image based on a recipe for the particular image and/or a context of the request. The recipe includes a set of instructions to be executed on the source image to generate the processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value, (f) a target contrast value, (g) a target saturation value, (h) a target portion of the image to be highlighted, or (i) a target area of the image to be cropped etc.

In some embodiments, the recipe can be provided by the client system 115. For example, the client system 115 can provide a recipe which instructs the image processing system 125 to crop an image to include only a portion of the image having faces of certain subjects. In another example, the recipe can instruct the image processing system 125 to crop a specific portion of the image if the image is rendered on a smartphone, but include a larger portion of the image when it is rendered on a laptop. In another example, the recipe can instruct the image processing system 125 to change a color pattern of the image in order to match with a webpage with which the image is displayed or to highlight/enhance a particular color of the image to grab attention from the end user.

In some embodiments, the recipe can also be generated by the image processing system 125. For example, the image processing system 125 can determine based on historical data, which of the colors when enhanced in the image received more attention from the users (determined based on, e.g., a number of clicks) and enhance the color of the image and/or other images in the webpage accordingly.

The recipe can be stored in a storage system such as a recipe store 130. In some embodiments, the recipe store 130 can be implemented as various storage systems including a database, a file system and/or any other convenient or known storage techniques.

In some embodiments, the recipe can also be based on a context of the request. The context of the request can include an attribute of the end user device 105*a,* such as (a) a type of the end user device 105*a,* (b) a size of a display of the end user device 105*a,* (c) a resolution of the display of the end user device 105*a,* (d) an operating system of the end user device 105*a,* (e) ambient lighting of the end user device 105*a* etc. For example, if the end user device 105*a* has a display with resolution higher than a predefined resolution, then the recipe can instruct the image to be rendered in a resolution higher than a predefined resolution. In some embodiments, the image processing system 125 can have a predefined range of resolutions at which the processed image can be rendered. In another example, if the end user device 105*a* has a display with resolution lower than a predefined resolution, then the recipe can instruct the image to be rendered in low resolution. In another example, the brightness of the image can be changed based on the ambient lighting condition on the end user device 105*a*.

Further, in some embodiments, the context of the request can also include network bandwidth availability between the end user device 105*a* and the client system 115. For example, if the network bandwidth is below a predefined threshold, the recipe can instruct the image processing system 125 to render a low resolution image. The context of the request can be included in the request and/or provided by the client system 115 independent of the request.

In some embodiments, various recipes can be used to generate various processed images for a particular image. The client system 115 may provide access to at least one source image to the image processing system 125 and request the image processing system 125 to return one or more processed images for the source image. For example, for a given image by the client system 115, various processed images such as a high resolution image, a low resolution image, an image with a particular color enhanced, an image with a particular color scheme, brightness, saturation or hue etc. can be generated using the corresponding recipe. In some embodiments, a given recipe can be reused for processing various images. For example, a default recipe can process one or more images. The default recipe can be for enhancing the colors, brightness, saturation etc. of the one or more images.

The image processing system 125 enables the client system 115 to obtain various processed images for a given single image. This minimizes the resources required for maintaining various versions of the images by the client system 115. However, in some embodiments, more than one source image may be used to render a processed image, for example, a derivative image. A derivative image is a kind of rendered image that depends on one or more original source images. For example, an image of a logo may be superimposed onto another image to obtain the derivative image. In embodiments where the image processing system 125 renders a derivative image, the image processing system 125 may retrieve the necessary original source images from the source image storage system 120.

The content published by the client system 115 can include text, video, audio, or any other multi-media content. The content can be published in many ways, including websites, applications (also known as "apps"). The content can be accessed by the end users in a number of ways, e.g., via web browsers, or apps which when executed on an end user device display the content.

In some embodiments, the image processing system 125 can be implemented as a multi-tier architecture having various tiers of servers performing specific functions of the image processing system 125. One such example multi-tier implementation of the image processing system 125 is illustrated in FIG. 2.

Figure 2:
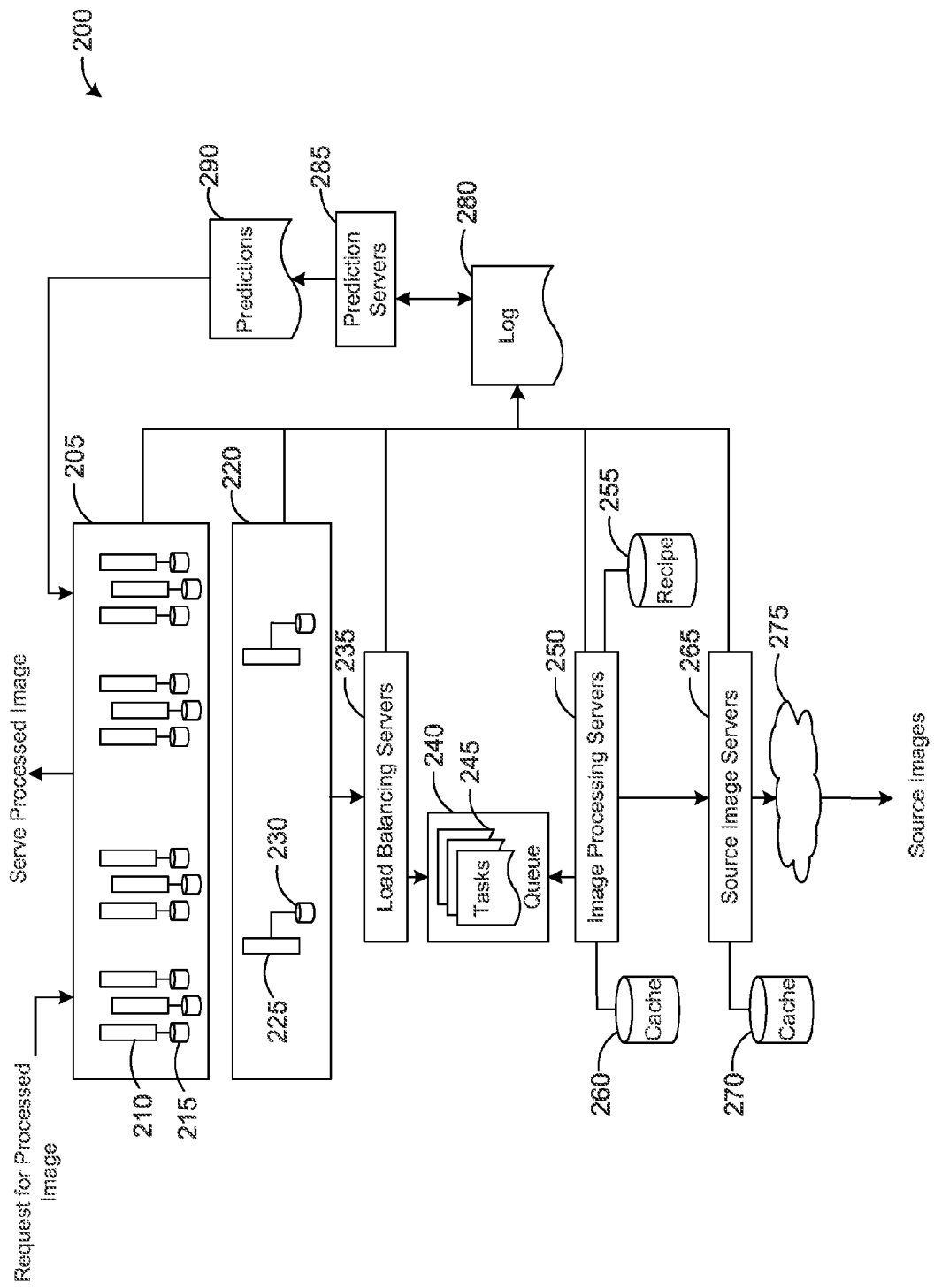
FIG. 2 illustrates a block diagram of an image processing system implemented as multi-tier architecture, consistent with various embodiments of the disclosed technology.

FIG. 2 illustrates a block diagram of an image processing system 200 implemented as a multi-tier architecture, consistent with various embodiments. The image processing system 200 includes various server tiers such as edge server tier 205, a shield server tier 220, load balancing server tier 235, an image processing server tier 250 and a source image server tier 265. In some embodiments, the image processing system 200 may be similar to the image processing system 125 of FIG. 1, and can be implemented in the environment 100.

Each of the tiers can have one or more servers. A server can be either a physical computer in a data center, or a virtual instance of a computer in cloud infrastructure. A server typically receives requests for work, performs or distributes the work, and then returns a response. The edge server tier 205 can receive requests from a client system such as client system 115 (e.g., on behalf of an end user) for obtaining processed images. For example, when the end user accesses the content published by the client system 115, which includes the processed image, the edge server tier 205 receives the request from the client system 115 to obtain the processed image. The edge server tier 205 includes multiple servers, such as edge server 210, and one or more associated caches, such as edge cache 215. In some embodiments, each of the edge servers in the edge server tier 205 has an associated edge cache as illustrated in FIG. 2. However, in some embodiments, the edge cache 215 may be associated with more than one edge server.

In some embodiments, the edge servers in the edge server tier 205 may be located in various geographical locations. The edge servers may be configured to serve requests from predefined geographical locations. When a request arrives at the edge server tier 205 from a client system, the request is routed to an edge server that is configured to serve the geographical location in which the particular client system is located. For example, while edge server 210 may be configured to serve requests from geographical locations A, B and C, another edge server may be configured to serve requests from geographical locations X, Y, and another edge server may be configured to serve requests from geographical location Z. That is, the edge servers in the edge server tier 205 act as a closest point of contact of the image processing system 200 for the client systems.

When a request is received at the edge server tier 205 from the client system 115 at a geographical location A, the edge server 210 checks whether the edge cache 215 has the processed image. If the edge cache 215 has the processed image, the edge server 210 serves the processed image to the client system 115, which further serves the processed image to the end user's device, such as end user device 105*a*. If the edge cache 215 does not contain the processed image, the edge server tier 205 passes the request to the shield server tier 220.

The shield server tier 220 includes multiple servers, such as shield server 225, and associated shield cache 230. In some embodiments, the shield servers in the shield server tier 220 can be distributed across various geographical regions. In some embodiments, a geographical region includes a number of geographical locations. The shield servers can be configured to receive requests from a group of edge servers in a particular geographical region. In some embodiments, the shield server tier 220 can have a shield server for every "x" number of edge servers, where "x" is a number configurable by a user, such as an administrator of the image processing system 200. The shield cache 230 can be associated with one or more shield servers, and the shield server tier 220 can have one or more shield caches.

When a shield server, such as shield server 225, receives the request from an edge server, such as edge server 210, the shield server 225 determines whether the shield cache 230 contains the processed image. If the shield cache can contains the processed image, the shield server 225 obtains the processed image from the shield cache 230 and returns the image to the edge server 210 which further serves the processed image to the client system 115. If the shield cache 230 does not contain the processed image, the shield server 225 passes the request to the load balancing server tier 235.

In some embodiments, the edge server tier 205 can bypass the shield server tier 220 and pass the request to the load balancing server tier 235 directly if the processed image is not available at the edge cache 215. However, typically, the edge server tier 205 determines whether the processed image is available at the shield server tier 220 before the request is passed to the load balancing server tier 235. In some embodiments, the time consumed for the determination, by the edge server, of whether a shield server contains the processed image is not significant because the edge server and the shield server can share the same communication network.

The load balancing server tier 235 receives the image processing requests 245 from the edge server tier 205 and/or shield server tier 220 and inserts them into a queue 240. An image processing server of the image processing server tier 250 fetches a request from the queue 240 and processes the request to generate a processed image. In some embodiments, the load balancing server tier 235 balances a load of the image processing system 200 by inserting the requests into the queue 240 and not assigning them directly to the image processing servers in the image processing server tier 250 upon receipt of a request at the load balancing server tier 235. The image processing server can pick up a request from the queue 240 when the image processing server is available to process a request.

In some embodiments, the load balancing server tier 235 determines whether a particular request is a valid request for an image before inserting the request into the queue 240. In some embodiments, the validity of the request can be determined by determining whether a signature of an image for which the request is received matches with the any of the signatures maintained at the image processing system 200. If the particular request is valid, the load balancing server tier 235 inserts it into the queue 240.

The image processing server tier 250 obtains an image processing request (also referred to as "a task") for a particular image from the queue 240 and processes the particular image based on a recipe for the particular image and the context of the request. The image processing server tier 250 determines whether the particular image, that is, an original source image provided by the client system 115 is available at the image processing server cache 260. If the original source image is available at the image processing server cache 260, the image processing server tier 250 obtains the image from the image processing server cache 260 and processes the original source image to generate the processed image. If the original source image is not available at the image processing server cache 260, the image processing server cache 250 requests the source image server tier 265 to obtain the original source image. The source image server tier 265 obtains the original source image and returns it to the image processing server tier 250 for processing the original source image. The image processing server tier 250 may store the received original source image at the image processing server cache 260.

In some embodiments, the source image server tier 265 obtains the original source image from a location specified by the client system 115, for example, at a storage such as the source image storage system 120. The source image server tier 265 obtains the original source image from the source image storage system 120 via a communication network 275 and returns the original source image to the image processing server tier 250. The source image server tier 265 can also store the retrieved original source image at the source image cache 270. In some embodiments, obtaining the original source image from the source image storage system 120 can consume significant amount of computing resources, especially in cases where the source image storage system 120 is implemented as cloud storage service, for a number of reasons including performing authentication operations, performing read operations from a slow storage medium such as a hard drive etc. Accordingly, in order to minimize the consumption of computing resources, the original source image retrieved by the source image server tier 265 may be stored at the source image cache 270.

Also, in some embodiments, the source image server tier 265 may, regardless of whether a request is received for obtaining a particular original source image, pre-fetch the original images from the source image storage system 120 and store the original source images in the source image cache 270. The pre-fetching may be performed based on a predefined condition, for example, at a particular time of the day, day of the week, etc., or when the load on the image processing system 200 is below a predefined threshold. In some embodiments, the pre-fetching may help the source image server tier 265 to minimize the delay caused due to obtaining a particular source image from the source image storage system 120, in serving a request for the particular original source image from the image processing server tier 250. The source image server tier 265 may refresh the source image cache 270, that is, add or delete original source images from the source image cache 270 based on predefined cache management policies.

Referring back to the image processing server tier 250, after obtaining the original source image, either from the image processing server cache 260 or from the source image server tier 265, the image processing server tier 250 identifies a recipe for the original source image and processes the original source image using the recipe and a context of the image processing request to generate a processed image. The recipe can be identified using various data including information regarding the client, the content being published (e.g., based on URL of a webpage of the content), information regarding attributes of an end user device from which the request is initiated etc. Any necessary information for determining the recipe for processing the original source image is provided to the image processing system 200, for example, via the request. In some embodiments, the information for determining the recipe may be provided by the client system 115 to the image processing system 200 independent of the request.

The recipe can be provided by the client and/or generated by the image processing system 200. The recipes can be stored at a storage system such as recipe storage system 255. In some embodiments, the recipe storage system 255 can be implemented as various storage systems, for example, a database, a file system and/or any other convenient or known storage techniques.

The recipe includes a set of instructions to be executed on the original source image to render a processed image. The recipe can include instructions regarding at least one of (a) a target size of the image to be rendered, (b) a target resolution of the image to be rendered, (c) a target color pattern of the image to be rendered, (d) a target layout of the image with respect to other content with which the image is served, (e) a target brightness value of the image to be rendered, (f) a target contrast value of the image to be rendered, (g) a target saturation value of the image to be rendered, (h) a target portion of the image to be highlighted, or (i) a target area of the image to be cropped etc.

In some embodiments, the recipe can also be based on a context of the request. The context of the request can include an attribute of the end user device 105*a*. The attribute of the end user device 105*a* can include at least one of (a) a type of the end user device 105*a*, (b) a size of a display of the end user device 105*a*, (c) a resolution of the display of the end user device 105*a*, (d) an operating system of the end user device 105*a*, or (e) ambient lighting of the end user device 105*a* etc. In some embodiments, the recipe can be determined based on the context of the request. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

Further, in some embodiments, the context of the request can also include network bandwidth availability between the end user device 105*a* and the client system 115. For example, if the network bandwidth is below a predefined threshold, the recipe can include instructions to render a low resolution image.

After the original image is processed based on the recipe and the context of the request, the processed image is returned to the client system 115 which further serves the processed image to the end user device 105*a*.

In some embodiments, when the image processing server tier 250 returns the processed image to the client system 115, the processed image is transmitted to the client system 115 though one or more tiers, e.g., load balancing server tier 235, shield server tier 220 and edge server tier 205, above the image processing server tier 250. The one or more tiers may also store the received processed image in a cache associated with the corresponding server tier.

In some embodiments, the image processing server tier 250 can include different servers for performing different parts of processing the image. For example, tasks such as face recognition can be performed by a set of servers, changing a color scheme of a specific portion can be performed by another set of servers, cropping can be performed by another set of servers etc. The image processing server tier 250 can have logic, either in software, hardware, firmware or a combination, to assign a particular image processing operation to a particular server in the image processing server tier 250.

Further, in some embodiments, a particular image processing request can be split into a number of sub-tasks. For example, if a particular request requires face recognition and cropping, the face recognition operation and the cropping operation can be split into two tasks and added to the queue 240 as two sub-tasks. The face recognition task can be assigned to a server that performs face recognition task and the cropping task can be assigned to a server that performs the cropping operation. The final processed image can be rendered by combining the results of the sub-tasks or having each successive task work on the image resulting from the previous sub-task until all the sub-tasks are completed.

In some embodiments, one or more tiers of the image processing system 200 generate log 280 containing information at least regarding image processing requests and the image processing operations performed on the images. The log 280 can include information such as whether a particular processed image was available in a cache associated with a particular tier or was retrieved from a cache associated with a tier below the particular tier; performance metrics on rendering the processed image, e.g., time taken to render the processed image, memory consumed, a size of the original source image, how many source images were used to generate the processed image, time taken to load, wait or convert a particular image, a total response time in serving the processed image to the client system 115, response time of each tier, average time a particular task was in the queue 240, a number of tasks waiting in the queue at a given point of time, a point in time when the maximum queue size was reached, a time when evicting queue items were started etc.

In some embodiments, each of the one or more tiers can generate the log 280 separately. In some embodiments, the one or more tiers can generate information into a single log file 280. The log 280 includes information to identify which of the tiers generated particular information in the log 280. In some embodiments, the image processing system 200 may use a logging system (not illustrated), e.g., real-time logging systems, to generate the log 280. The logging system can be provided by a third party.

In some embodiments, the information in the log 280 can be analyzed and used to enhance the performance of the image processing system 200. In some embodiments, the information in the log 280 can be used to predict image processing requests that may be received in the future and pre-render the processed images in advance. The pre-rendered images may be stored at a cache, such as edge server cache 215. When a predicted request is actually received at the edge server tier 205, the edge server 210 may obtain the processed image from the edge server cache 215 and return the processed image to the client system 115. By predicting the requests, processing the predicted request to rendered the processed image and storing the processed image at the cache in advance of receiving the actual request, the time consumed in obtaining the processed image when the actual request is received is minimized significantly. This enhances the user experience of the end user since the end user experiences minimum to near zero delay in the processed image being rendered on the end user device 105a.

In some embodiments, the image processing system 200 includes prediction servers 285 that generate predictions 290 having information regarding future image processing requests. The predictions 290 are input to the image processing system 200 via the edge server tier 205 (similar to the image processing requests from client system 115) which renders the processed images based on the predictions 290. In some embodiments, the image processing system 200 may schedule rendering of the processed images for the predictions 290 based on a predefined criterion. For example, image processing system 200 may decide to render the processed images for the predictions 290 when a load on the image processing system 200 is below a predefined threshold, at a particular time of the day, a particular time of the week, when a predefined number of requests have been received from a particular client system, etc.

The prediction servers 285 can generate the predictions 290 based on the information in the log 280 using various known prediction techniques. For example, the predictions 290 can be generated based on a statistical analysis of the information in the log 280. In another example, the prediction servers 285 can employ an expert system or a rule engine that can help in generating the predictions 290 based on the information in the log 280.

In some embodiments, one or more tiers of the image processing system 200 can be owned or operated by different entities. That is, the image processing system 200 can be a combination of various infrastructure provided by different entities.

Figure 3:
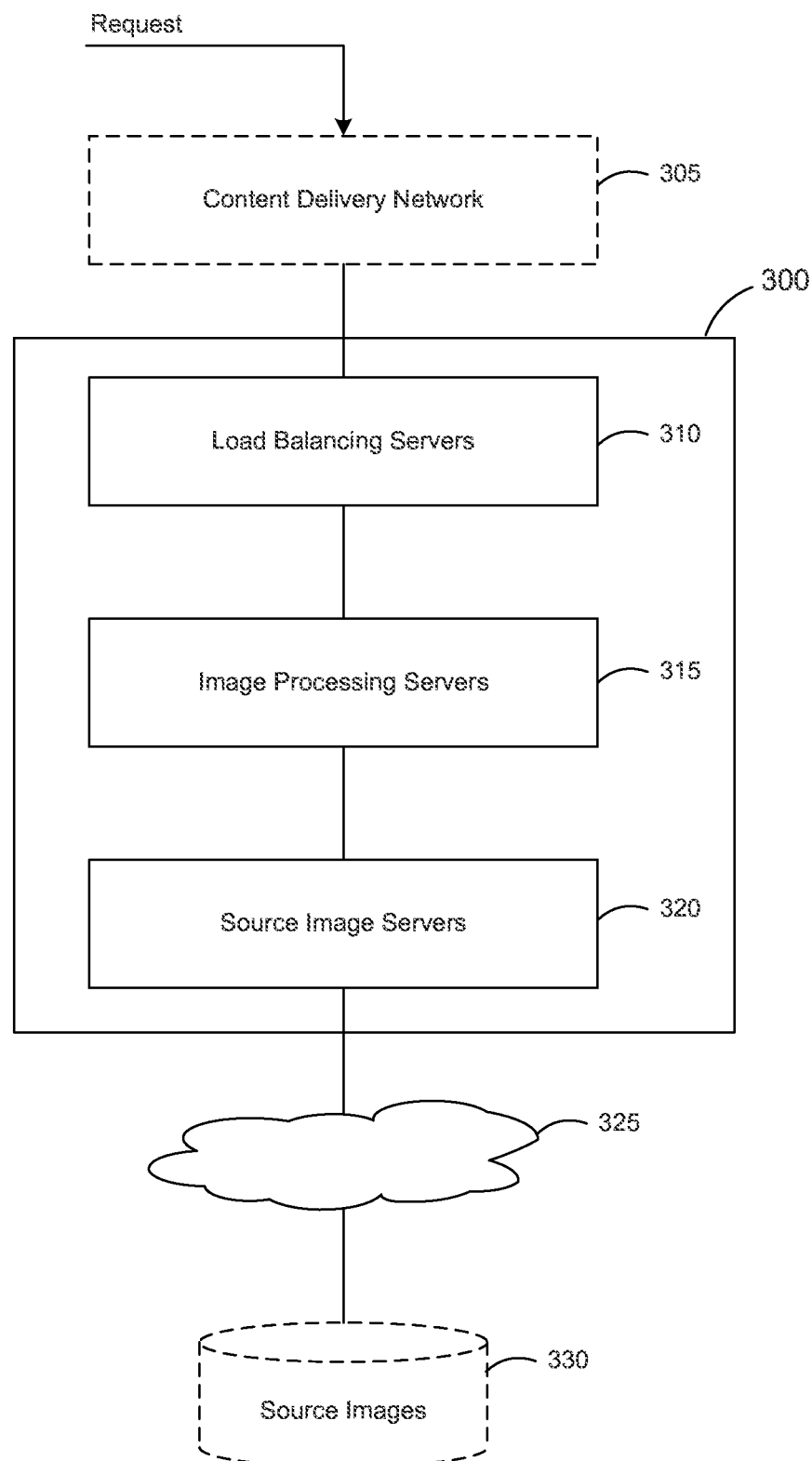
FIG. 3 illustrates a block diagram of an example implementation of an image processing system having infrastructure from various entities, consistent with various embodiments of the disclosed technology.

FIG. 3 illustrates a block diagram of an example implementation of an image processing system 300 having infrastructure from various entities, consistent with various embodiments of the disclosed technology. The example implementation includes a content delivery network (CDN) 305 that is designed to help position content, including processed images, around the world as close to the clients consuming it as possible.

In some embodiments, the CDN 305 can be a large distributed system of servers deployed in multiple data centers across the Internet. The goal of CDN 305 can be to serve content to end-users with high availability and high performance. The CDNs serve content, including web objects (text, graphics and scripts), downloadable objects (media files, software, documents), applications (e-commerce, portals), live streaming media, on-demand streaming media, and social networks.

In some embodiments, the CDNs served content using dedicated servers owned and operated by the CDN operator who is different from an image processing entity providing the image processing system 300 (including tiers 310-320). The image processing entity may ask the CDN operator to configure the CDN 305 as per the image processing entity's needs to serve the processed images to the clients.

In some embodiments, there the CDN 305 can also be based on a hybrid model that uses peer-to-peer (P2P) technology. In the hybrid model, content is served using both dedicated servers of the CDN operator and other peer-user-owned, for example, image processing entity, computers as applicable. However, in some embodiments, the image processing entity may also own and operate the CDN 305 entirely.

A source image storage system 330 includes original source images of the clients, such as client system 115 of FIG. 1. The image processing system 300 can obtain the original source images from the source image storage system 330 for rendering processed images. The source image storage system 330 can be owned by the client system 115, or can be a third party storage service such as a cloud storage to which the client system 115 has subscribed to for storing the original source images. The image processing system 300 may obtain the original source images from the source image storage system 330 via a communication network 325. In some embodiments, the clients can have different source image storage systems. Accordingly, the image processing system 300 may access the corresponding source storage system using the credentials provided by the corresponding client.

Referring back to the CDN 305, in some embodiments, the CDN 305 provides edge servers, such as edge server tier 205, and, in some cases, also shield servers, such as shield server tier 220, for caching the processed images around various geographical locations. The processed images (potentially multiple copies) may exist on several edge and/or shield servers. When an end user contacts the client system 115 for accessing content (which includes the processed image) published by the client system 115, the client system 115 in turn requests the CDN 305, e.g., using a CDN hostname to obtain the processed image. A domain name service (DNS) will resolve the request to an optimized CDN edge server (based on location, availability, cost, and other metrics) and that edge server will handle the request.

After a particular edge server receives the request, the process for obtaining the processed image is similar to the process described above at least with reference to FIG. 2. In some embodiments, a load balancing server tier 310 is similar to load balancing server tier 235, an image processing server tier 315 is similar to the image processing server tier 250 and source image server tier 320 is similar to the source image server tier 265. In FIG. 3, the CDN 305 and the source image storage system 330 are illustrated in dashed lines to indicate that those entities can be owned and/or operated by an entity other than the image processing entity.

Figure 4:
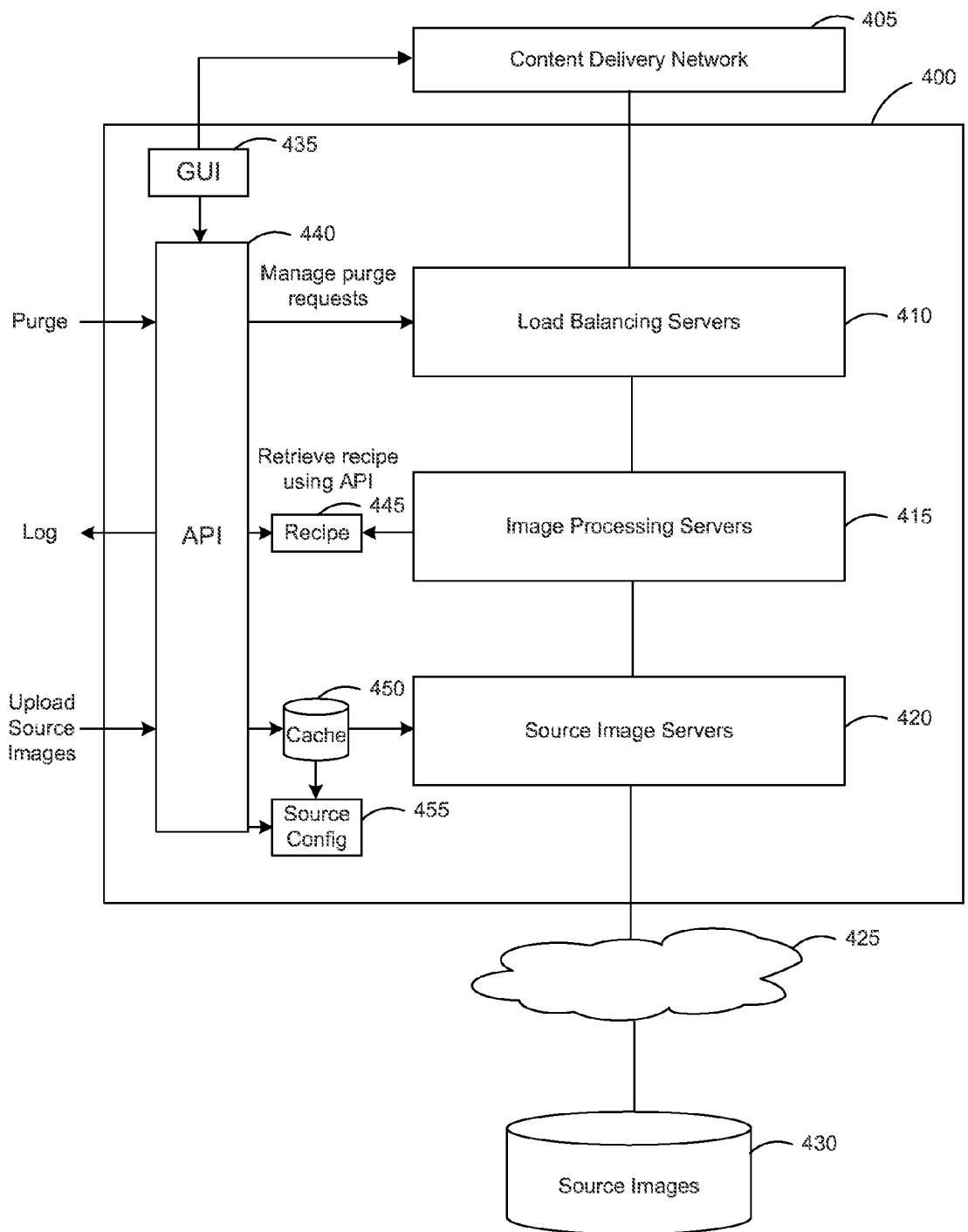
FIG. 4 is a block diagram illustrating an application programming interface (API) of an image processing system for performing various operations, consistent with various embodiments of the disclosed technology.

FIG. 4 is a block diagram illustrating an application programming interface (API) of an image processing system 400 for performing various operations, consistent with various embodiments of the disclosed technology. In some embodiments, the image processing system 400 is similar to the image processing system 300 of FIG. 3 and a load balancing server tier 410, an image processing server tier 415, a source image server tier 420 to the load balancing server tier 310, the image processing server tier 315, the source image server tier 320, respectively. In some embodiments, CDN 405, a source image storage system 430 and a communication network 425 are similar to the CDN 305, the source image storage system 330 and the communication network 325, respectively. Further, a source image server cache 455 is similar to the source image cache 270 of FIG. 2.

The image processing system 400 provides an API 440 for performing various functions of the image processing system. The API 440 includes a purge API for purging various kinds of data from a cache or other storage systems based on a predefined criterion. For example, when an original source image changes, then all the derivative images that used that original source image must immediately be purged so that they can be updated. Further, in some embodiments, items from a cache can also be evicted based on various eviction policies, e.g., least recently used policy, in order to make room for new items.

The API 440 includes APIs for generating, storing and retrieving recipes 445. The API 440 includes APIs for retrieving source configuration files 455 that contains data, including authentication data, necessary for establishing a secure connection to the source image storage system 430. The API 440 includes APIs for uploading source images to the source image storage system 430. In some embodiments, a client, such as client system 115, can use the image uploading API to upload source images to the source storage system 430. In some embodiments, the source images so uploaded can also be stored at the source image cache 450 simultaneously which helps in fast retrieval of the source image by the source image server tier 420 when asked to retrieve the source image. By storing the source image at the source image cache 450, computing resources, such as time and network bandwidth, that may be consumed for obtaining the source image from the source storage system 430 is minimized.

A graphical user interface (GUI) 435 may be provided to the clients for generating recipes 445 and providing the recipes 445 to the image processing system. In some embodiments, the GUI 435 can be integrated into the client applications that publish content to the end users. For example, the GUI 435 can be integrated into a website published by the client system 115 that contains the processed image. The client system 115 may use the GUI 435, which uses the API 440, to edit the images displayed in the website and create a recipe based on the edits performed to the image. The recipe so created can be sent to the image processing system. The GUI 435 may also issue image processing requests to the image processing system.

The API 440 also provides APIs for generating a log file such as log 280 containing various data regarding processing of the images. In some embodiments, the API 440 may use a logging system (not illustrated), e.g., real-time logging systems, to generate the log 280. The logging system can be provided by a third party.

Figure 5:
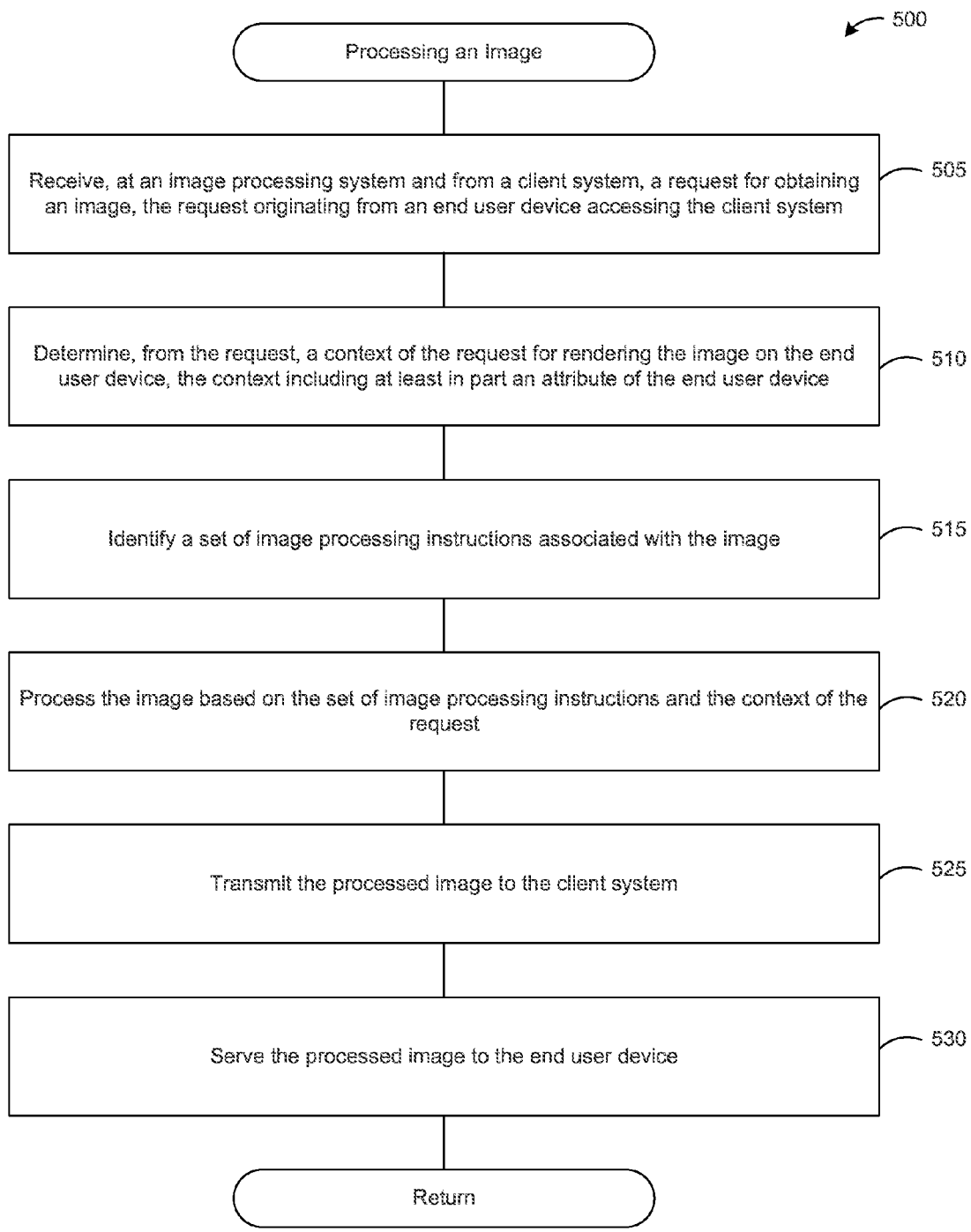
FIG. 5 is a flow diagram of a process for processing (rendering) an image using a recipe, consistent with various embodiments of the disclosed technology.

FIG. 5 is a flow diagram of a process for processing an image using a recipe, consistent with various embodiments. In some embodiments, the process 500 may be implemented in an environment such as environment 100 of FIG. 1. At step 505, an image processing system 125 receives a request from a client system, such as client system 115, for obtaining a processed image for a particular image. In some embodiments, the request can be originated from an end user device, such as end user device 105*a*, accessing content published by the client system 115. For example, the request can be generated when the end user device 105*a* accesses a URL of a website of the client system 115 having the processed image.

At step 510, the image processing system 125 determines a context of the request for rendering the image on the end user device 105*a*. In some embodiments, the context of the request includes at least an attribute of the end user device 105*a*. At step 515, the image processing system 125 identifies a recipe associated for generating the processed image. The recipe includes a set of instructions for processing the particular image. At step 520, the image processing system 125 processes the particular image based on the recipe and the context of the request to generate the processed image.

In some embodiments, processing the image includes rendering the image based on (a) a target size, (b) a target resolution, (c) a target color pattern, (d) a target layout of the image with respect to other content with which the image is served, (e) a target brightness value, (f) a target contrast value, or (g) a target saturation value. The processing can also include highlighting a target portion of the image or cropping a target area of the image, recognizing a face in the image, performing predefined image editing operations on the recognized face etc.

Further, the above processing can also be dependent on the attribute of the end user device 105*a* such as (a) a type of the end user device 105*a*, (b) a size of a display of the end user device 105*a*, (c) a resolution of the display of the end user device 105*a*, (d) an operating system of the end user device 105*a*, (e) ambient lighting of the end user device 105*a* etc. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

At step 525, the image processing system 125 transmits the processed image to the client system 115. At step 530, the client system 115 serves the processed image to the end user device 105*a*. For example, the processed image is served with the content in response to the end user device 105*a* accessing the URL of the website of the client system 115.

Figure 6:
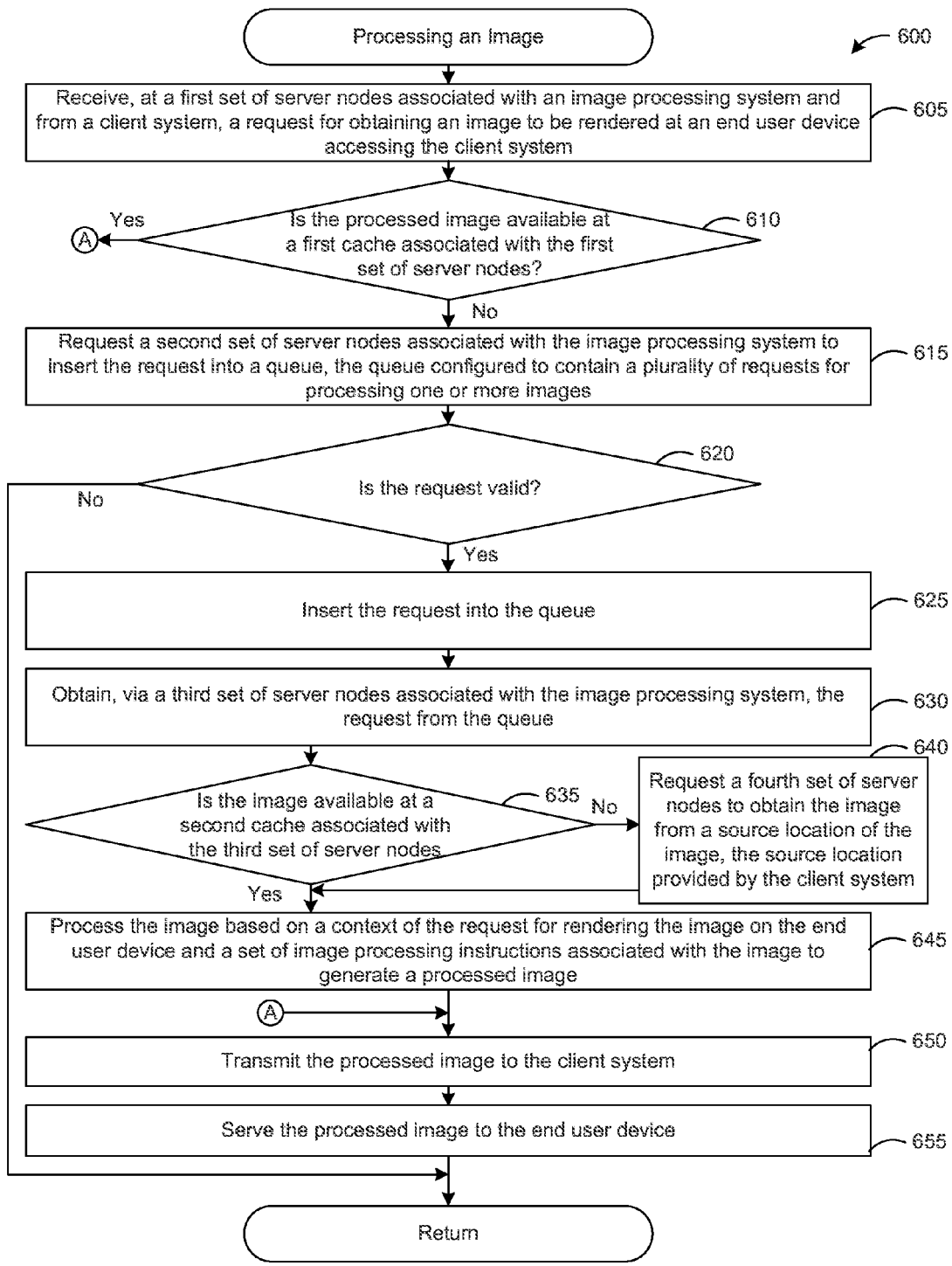
FIG. 6 is a flow diagram of another process for processing an image using a recipe in a multi-tiered image processing system, consistent with various embodiments of the disclosed technology.

FIG. 6 is a flow diagram of another process for processing an image using a recipe in a multi-tiered image processing system, consistent with various embodiments. In some embodiments, the process 600 may be implemented in an image processing system such as image processing system 200 of FIG. 2. At step 605, a first set of server nodes associated with the image processing system 200 receives a request for obtaining a processed image (of a particular image) to be rendered at an end user device, such as end user device 105*a*, accessing a client system, such as the client system 115. In some embodiments, the first set of server nodes can include one or more server tiers such as edge server tier 205 and/or shield server tier 220. In some embodiments, the first set of server nodes is the closest point of the image processing system 200 for the client system 115.

In some embodiments, the edge servers may be located in various geographical locations. The servers in the edge server tier 205 may be configured to serve requests from predefined geographical locations. The shield servers can be distributed across various geographical regions, wherein a geographical region includes a number of geographical locations. In some embodiments, the shield servers can be configured to receive requests from a group of edge servers in a particular geographical region.

At step 610, the first set of server nodes determines whether the processed image is available at a first cache associated with the first set of server nodes. In some embodiments, the edge server tier 205 has one or more associated edge server caches and if a shield server tier 220 exists, the shield server tier 220 will also have one or more associates shield server caches. At step 615, if the processed image is available at the first cache (edge server cache and/or shield server cache) associated with the first set of server nodes, the processed image is retrieved and the control is transferred to step 650 where the processed image is transmitted to the client system 115. On the other hand, responsive to a determination that the processed image is not available at the first cache, the first set of server nodes asks a second set of server nodes associated with the image processing system 200 to insert the request into a queue such as queue 240. In some embodiments, the second set of server nodes can be a load balancing server tier 235.

At step 620, the second set of server nodes determines whether the request is a valid request. In some embodiments, the validity of the request can be determined by determining whether a signature of an image for which the request is received matches with the any of the signatures maintained at the image processing system 200. If the particular request is not valid, the process 600 returns. On the other hand, if the request is valid, at step 625, the second set of server nodes inserts the request into the queue 240.

At step 630, a third set of server nodes, such as image processing server tier 250, obtains the request from the queue 240. The queue 240 can have multiple requests for processing one or more images. Further, a request can be split into multiple sub-tasks. For example, if a particular request requires face recognition and cropping, the face recognition operation and the cropping operation can be split into two tasks and added to the queue 240 as two sub-tasks. The face recognition task can be assigned to a server that performs face recognition task and the cropping task can be assigned to a server that performs the cropping operation.

After obtaining the request from the queue 240, the image processing server tier 250, determines whether the original source image for which the processed image has to be rendered is available at a cache associated with the third set of server nodes, such as the image processing server cache 260. Responsive to a determination that the original source image is not available at the image processing server cache 260, the third set of server nodes requests a fourth set of server nodes, such as source image server tier 265, to obtain the original source image. The source image server tier 265 obtains the original source image from either a cache, such as source image server cache 270, associated with the source image server tier 265 or from a location specified by the client system 115. In some embodiments, the location specified by the client system 115 can be a third party storage service such as a cloud storage service. The source image server tier 265 may obtain the original source image from the cloud storage service using the authentication credentials provided by the client system 115.

Referring back to step 635, if the original source image is available at the image processing server cache 260, the image processing server tier 250 retrieves the original source image from the image processing server cache 260 and proceeds with processing the image at step 645.

At step 645, the image processing server tier 250 processes the original source image based on the recipe and the context of the request. In some embodiments, processing the original source image includes identifying a recipe associated with the original source image and retrieving the associated recipe from a storage system, such as recipe storage system 255. The image processing server tier 250 may access the recipe using an API such as API 440 of FIG. 4.

In some embodiments, processing the original source image based on the recipe includes rendering the image based on (a) a target size, (b) a target resolution, (c) a target color pattern, (d) a target layout of the image with respect to other content with which the image is served, (e) a target brightness value, (f) a target contrast value, or (g) a target saturation value. The processing can also include highlighting a target portion of the image or cropping a target area of the image, recognizing a face in the image, performing predefined image editing operations on the recognized face etc.

Further, the above processing can also be dependent on the context of the request, which includes one or more attributes of the end user device 105*a* such as (a) a type of the end user device 105*a*, (b) a size of a display of the end user device 105*a*, (c) a resolution of the display of the end user device 105*a*, (d) an operating system of the end user device 105*a*, (e) ambient lighting of the end user device 105*a* etc. For example, if the end user device 105*a* has a display with a resolution higher than a predefined resolution, then the recipe can include instructions to render the image in high resolution. In another example, if the end user device 105*a* has a display with resolution lower than a predefined resolution, then the recipe can include instructions to render the image in low resolution. In another example, the brightness of the image can be changed based on the ambient lighting condition on the end user device 105*a*.

In some embodiments, the processed image rendered by the image processing server tier 250 is a derivate image. A derivative image is a kind of rendered image that depends on one or more original source images. In embodiments where the image processing server tier 250 renders a derivative image, the image processing server tier 250 may retrieve the necessary original source images from the image processing server cache 260 and/or the source image server tier 265. In some embodiments, the recipe can include the data regarding the original source images required for the recipe and may also include the locations of the original source images.

At step 650, the image processing server tier 250 transmits the processed image to the client system 115. In some embodiments, when the image processing server tier 250 returns the processed image to the client system 115, the processed image is transmitted to the client system 115 though one or more tiers, e.g., load balancing server tier 235, shield server tier 220 and edge server tier 205, above the image processing server tier 250. The one or more tiers may also store the processed image received from the image processing server tier 250 in a cache associated with the corresponding server tier.

At step 655, the client system 115 serves the processed image to the end user device 105a. For example, the processed image is served with the content in response to the end user device 105a accessing the URL of the website of the client system 115.

Figure 7:
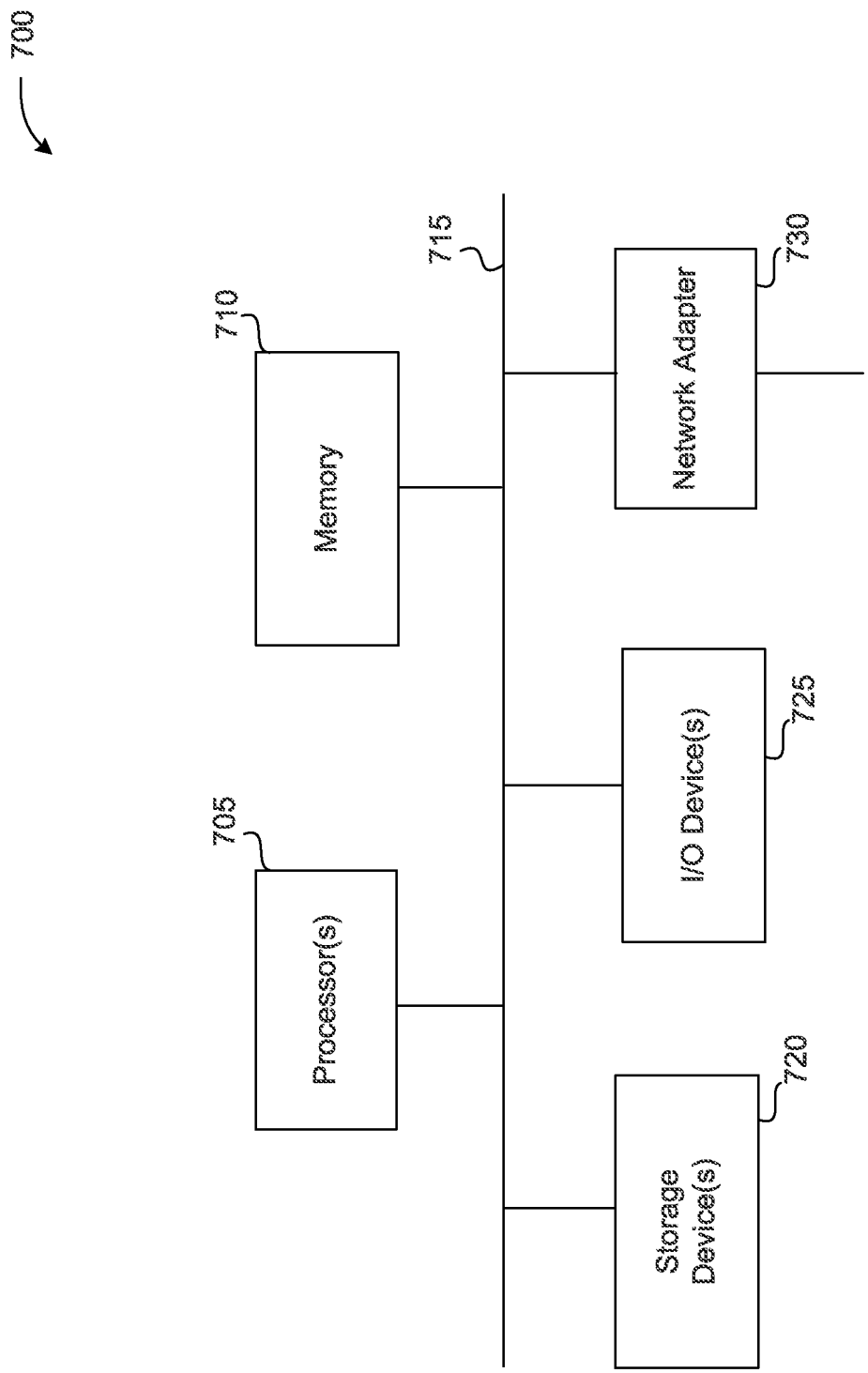
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
   receiving, at an image processing system and from a client system that publishes content, a request for obtaining an image, the request originating from an end user device accessing the client system;

determining, by the image processing system and from the request, a context of the request for rendering the image on the end user device, the context including at least one of an hardware attribute or a software attribute of the end user device;

identifying, by the image processing system, a set of image processing instructions associated with the image; and processing, by the image processing system, the image based on the set of image processing instructions and the context of the request to generate a processed image, the image processing system implemented as a multi-tiered server architecture, the processing including:

receiving, by a server in a first tier of the multi-tiered server architecture, an image processing request for processing the image, determining, by the server in the first tier, if the processed image is stored in a first cache associated with the first tier, in an event the processed image is stored in the first cache, returning the processed image to the client system, in an event the processed image is not stored in the first cache, adding, by the server in the first tier, the image processing request into a queue at a server of a load balancing tier of the multi-tiered server architecture, retrieving, by a server of a second tier of the multi-tiered server architecture, the image processing request from the queue, and processing, by the server of the second tier, the image to generate the processed image, wherein the processing includes obtaining, by a server of a third tier of the multi-tiered server architecture, the image from a storage system if the image is not stored at a second cache associated with the second tier, and wherein the server of the third tier is different from the server of the load balancing tier.

2. The method of claim 1 further comprising:

transmitting, by the image processing system, the processed image to the client system; and serving, by the client system, the processed image to the end user device.

3. The method of claim 1, wherein the hardware attribute or the software attribute of the end user device includes at least one of (a) a type of the end user device, (b) a size of a display of the end user device, (c) a resolution of the display of the end user device, (d) an operating system of the end user device, or (e) ambient lighting of the end user device.

4. The method of claim 1, wherein the context of the request includes a network bandwidth available to the end user device.

5. The method of claim 1, wherein the set of image processing instructions is provided at least in part by the client system.

6. The method of claim 1, wherein the set of image processing instructions is determined by the image processing system.

7. The method of claim 1, wherein the set of image processing instructions includes instructions regarding at least one of: (a) a target size of the image, (b) a target resolution of the image, (c) a target color pattern of the image, (d) a target layout of the image with respect to other content with which the image is served, (e) a target brightness value, (f) a target contrast value, (g) a target saturation value, (h) a target portion of the image to be highlighted, or (i) a target area of the image to be cropped.

8. The method of claim 1, wherein processing the image based on the set of image processing instructions and the context of the request includes adjusting the set of image processing instructions based on the context of the request.

9. The method of claim 1, wherein processing the image to generate the processed image includes:

obtaining, by the image processing system and from the client system, a source location of the image, and processing, by the image processing system, the image obtained from the source location based on the set of image processing instructions and the context of the request to generate the processed image.

10. The method of claim 9, wherein the image is stored at a third-party storage service, and acts as a source image for generating a plurality of processed images.

11. The method of claim 9 further comprising:

processing, by the image processing system, the image obtained from the source location based on different set of image processing instructions to generate different processed images.

12. The method of claim 11, wherein the different processed images are stored at a cache associated with the image processing system.

13. The method of claim 1, wherein the image processing system is associated with a first entity and the client system is associated with a second entity, the first entity being different from the second entity.

14. A computer-readable storage medium storing computer-readable instructions, comprising:

instructions for receiving, at a first set of server nodes associated with an image processing system and from a client system, a request for obtaining an image to be rendered at an end user device accessing the client system;

instructions for determining if a processed image corresponding to the image is stored in a first cache associated with the first set of server nodes, wherein the processed image is generated by processing the image based on a recipe and a context of the request, the recipe including a set of image processing instructions and the context including at least one of a hardware attribute or a software attribute of the end user device;

in an event the processed image is stored in the first cache, instructions for returning the processed image to the client system;

in an event the processed image is not stored in the first cache, instructions for inserting, by a second set of server nodes associated with the image processing system, the request into a queue associated with the second set of server nodes, the queue configured to contain a plurality of requests for processing one or more images, the inserting including determining, by the second set of server nodes, whether the request for the image is a valid request based on a signature of the image; and instructions for processing, by a third set of server nodes associated with the image processing system, the request from the queue to generate the processed image based on the recipe and the context, wherein the processing includes obtaining, by a fourth set of server nodes, the image from a storage system, and wherein the fourth set of server nodes is different from the second set of server nodes.

15. The computer-readable storage medium of claim 14 further comprising:

instructions for transmitting, by the image processing system, the processed image to the client system; and instructions for serving, by the client system, the processed image to the end user device.

16. The computer-readable storage medium of claim 15, wherein the instructions for transmitting the processed image to the client system includes:
  instructions for transmitting the processed image by the third set of server nodes to the second set of server nodes,
  instructions for transmitting the processed image by the second set of server nodes to the first set of server nodes, and
  instructions for transmitting the processed image by the first set of server nodes to the client system.

17. The computer-readable storage medium of claim 14, wherein the hardware attribute or the software attribute of the end user device includes at least one of (a) a type of the end user device, (b) a size of a display of the end user device, (c) a resolution of the display of the end user device, (d) an operating system of the end user device, or (e) ambient lighting of the device.

18. The computer-readable storage medium of claim 14, wherein the instructions for processing the image based on the recipe and the context of the request includes:
  instructions for determining, by the third set of server nodes and from the recipe, at least one of (a) a target size of the image, (b) a target resolution of the image, (c) a target color pattern of the image, (d) a target layout of the image with respect to other content with which the image is served, (e) a target brightness value, (f) a target contrast value, (g) a target saturation value, (h) a target portion of the image to be highlighted, or (i) a target area of the image to be cropped; and
  instructions for generating the processed image based on the determination.

19. The computer-readable storage medium of claim 14, wherein the instructions for processing the image based on the recipe includes instructions for obtaining, by the third set of server nodes, the recipe from a storage system.

20. The computer-readable storage medium of claim 14, wherein the recipe is provided, at least in part, by the client system.

21. The computer-readable storage medium of claim 14 further comprising:
  instructions for storing the processed image at the first cache associated with the first set of server nodes.

22. The computer-readable storage medium of claim 14, wherein the instructions for processing the request from the queue by the third set of server nodes includes instructions for obtaining, by the third set of server nodes, the request from the queue.

23. The computer-readable storage medium of claim 14, wherein the instructions for processing the request from the queue by the third set of server nodes includes:
  instructions for determining, by the third set of server nodes, whether the image exists at a second cache associated with the third set of server nodes,
  responsive to a determination that the image is not available at the second cache, instructions for requesting, by the third set of server nodes, the fourth set of server nodes to obtain the image.

24. The computer-readable storage medium of claim 23, wherein the fourth set of server nodes is configured to obtain the image from a source location of the image specified by the client system and store the image at a third cache associated with the fourth set of server nodes.

25. The computer-readable storage medium of claim 14, wherein the fourth set of server nodes is configured to store a set of images uploaded to the image processing system by the client system at a source location specified by the client system.

26. The computer-readable storage medium of claim 14, wherein the third set of server nodes includes a plurality of server computers, different server computers of the plurality of server computers designated to at least one of (a) perform a particular type of processing of the image or (b) process a particular type of the image.

27. The computer-readable storage medium of claim 14, wherein the instructions for processing the request from the queue by the third set of server nodes includes:
  instructions for dividing, by the third set of server nodes, the processing into a number of sub-tasks, and
  instructions for requesting, by the third set of server nodes, the second set of server nodes into insert the sub-tasks into the queue.

28. The computer-readable storage medium of claim 14 further comprising:
  instructions for generating, by the image processing system, a log file containing data related to the processing of the image.

29. The computer-readable storage medium of claim 28 further comprising:
  instructions for analyzing, by a prediction server node associated with the image processing system, the log file to predict at least one of (a) one or more images to be requested at a later time, (b) a type of processing to be performed on the one or more images, or (c) a context of requests for the one or more images; and
  instructions for processing, by the image processing system, the one or more images based on the predicted type of processing and the predicted context of requests.

30. An apparatus comprising:
  a processor; and
  a memory having instructions which, when executed by the processor, performs a method of:
    receiving, at one of a plurality of edge server computers associated with an image processing system, a request for obtaining an image, the image to be rendered at an end user device accessing a client system,
    inserting, by one of a plurality of load balancing server computers associated with the image processing system, the request into a queue having a plurality of requests for processing a set of images, wherein the request is inserted into the queue if a processed image corresponding to the image is not stored in a first cache associated with the plurality of edge server computers,
    obtaining, by one of a plurality of source image server computers, the image from a source location specified by the client system and storing the image at a second cache associated with the source image server computers,
    retrieving, by one of a plurality of image processing server computers associated with the image processing system, the request from the queue, and
    processing, by the one of the plurality of image processing server computers, the image to generate the processed image, wherein the image is processed based on a set of image processing instructions associated with the image and a context of the request, the context including at least one of a hardware attribute or a software attributed of the end user device.

31. The apparatus of claim 30, wherein the plurality of edge server computers are located at different geographical locations, and each of the plurality of edge server computers is configured to:

receive a plurality of image processing requests originating from a plurality of end user devices in a set of geographical locations, and store a plurality of processed images served to the end user devices in the set of geographical locations in the first cache.

32. The apparatus of claim 30, wherein the memory further comprises instructions to perform the method of:

receiving, at one of a plurality of shield server computers, requests from a subset of the plurality of edge server computers, if the first cache does not have processed images associated with the requests, and storing the processed images that are served to end user devices in a set of geographical locations served by the subset of the plurality of edge server computers in a third cache.

33. The apparatus of claim 30 further comprising:

a prediction server computer that is configured to:

analyze data related to processing of a plurality of images, and predict at least one of (a) one or more images to be requested by a plurality of end user devices at a later time, (b) a type of processing to be performed on the one or more images, or (c) a context of requests for the one or more images from the end user devices.

* * * * *